(12) United States Patent
Langenfelder et al.

(10) Patent No.: US 10,717,856 B2
(45) Date of Patent: *Jul. 21, 2020

(54) POLYPROPYLENE COMPOSITION FOR FOAMING

(71) Applicant: Basell Poliolefine Italia S.r.l., Milan (IT)

(72) Inventors: Dieter Langenfelder, Aufseb (DE); Jurgen Rohrmann, Kelkheim (DE)

(73) Assignee: Basell Poliolefine Italia S.r.l., Milan (IT)

( * ) Notice: Subject to any disclaimer, the term of this patent is extended or adjusted under 35 U.S.C. 154(b) by 219 days.

This patent is subject to a terminal disclaimer.

(21) Appl. No.: 15/425,759

(22) Filed: Feb. 6, 2017

(65) Prior Publication Data

US 2017/0145200 A1 May 25, 2017

Related U.S. Application Data

(63) Continuation of application No. 14/355,476, filed as application No. PCT/EP2012/070443 on Oct. 16, 2012, now Pat. No. 9,587,079.

(60) Provisional application No. 61/554,830, filed on Nov. 2, 2011.

(51) Int. Cl.
| | |
|---|---|
| C08L 23/14 | (2006.01) |
| C08L 23/12 | (2006.01) |
| C08K 7/14 | (2006.01) |
| C08L 23/16 | (2006.01) |
| C08J 9/00 | (2006.01) |
| B29C 44/58 | (2006.01) |
| B29K 23/00 | (2006.01) |

(52) U.S. Cl.
CPC .......... *C08L 23/14* (2013.01); *C08J 9/0061* (2013.01); *C08J 9/0085* (2013.01); *C08L 23/12* (2013.01); *C08L 23/142* (2013.01); *B29C 44/586* (2013.01); *B29K 2023/12* (2013.01); *C08J 2323/14* (2013.01); *C08J 2423/12* (2013.01); *C08J 2423/14* (2013.01); *C08K 7/14* (2013.01); *C08L 23/16* (2013.01); *C08L 2203/14* (2013.01); *C08L 2205/025* (2013.01); *C08L 2205/03* (2013.01); *C08L 2207/02* (2013.01); *C08L 2207/04* (2013.01)

(58) Field of Classification Search
CPC ........ C08L 23/12; C08L 23/14; C08L 23/142; C08L 2207/02; C08K 3/40; C08K 7/14; C08J 9/00–42
See application file for complete search history.

(56) References Cited

U.S. PATENT DOCUMENTS

| | | | |
|---|---|---|---|
| 5,656,675 A | 8/1997 | Kobayashi et al. | |
| 6,586,531 B2 | 7/2003 | Washiyama et al. | |
| 9,587,079 B2* | 3/2017 | Langenfelder | ........ C08L 23/142 |
| 2003/0040583 A1 | 2/2003 | Washiyama et al. | |
| 2006/0194924 A1 | 8/2006 | Pelliconi | |
| 2008/0161474 A1* | 7/2008 | Shimouse | ............... C08L 23/12 |
| | | | 524/449 |
| 2010/0201016 A1* | 8/2010 | Kawamura | ........... C08F 297/08 |
| | | | 264/54 |
| 2010/0298456 A1 | 11/2010 | Nakajima et al. | |
| 2010/0317791 A1 | 12/2010 | Stockreiter et al. | |
| 2012/0225993 A1 | 9/2012 | Bernreitner et al. | |

FOREIGN PATENT DOCUMENTS

| | | |
|---|---|---|
| CN | 1134346 A | 10/1996 |
| CN | 1768107 A | 5/2006 |
| EP | 0711808 A1 | 5/1996 |
| EP | 1357144 A1 | 10/2003 |
| EP | 2062936 A1 | 5/2009 |
| EP | 2308923 A1 | 4/2011 |
| JP | 2002003691 A * | 1/2002 |
| JP | 2002137305 A | 5/2002 |
| WO | WO-2009057825 A1 | 5/2009 |
| WO | WO-2011042364 A1 | 4/2011 |

OTHER PUBLICATIONS

Standard Test Method for Determination of Xylene Solubles in Propylene Plastics. ASTM D5492. http://www.astm.org/Standards/D5492.htm. As viewed on Jun. 9, 2015. (Year: 2015).*
Ogawa, T. Effects of Moleculuar Weight on Mechanical Properties of Polypropylene. Journal of Applied Polymer Science, vol. 44, 1992, pp. 1869-1871. (Year: 1992).*
Properties of Polypropylene. eFunda. http://www.efunda.com/Materials/polynners/properties/polymer_datasheet.cfm?MajorID=PP&MinorID=1. As viewed on Jun. 9, 2015. (Year: 2015).*
Machine Translation of JP2002-003691A. Jan. 9, 2002. (Year: 2002).*

* cited by examiner

*Primary Examiner* — Stephen E Rieth

(57) ABSTRACT

The present invention relates to a new polypropylene composition for molded articles, such as finished parts for the automotive industry. A composition comprising: (A) from 40 to 85% by weight of a first propylene-based component being selected from propylene homopolymers, propylene copolymers and heterophasic propylene polymer, such first propylene-based component having a flexural modulus higher than 800 MPa; (B) from 5 to 20% by weight of a second propylene-based component being a heterophasic propylene polymer comprising: (B1) from 20 to 90% by weight of a crystalline polypropylene, and (B2) from 10 to 80% by weight of a copolymer of ethylene and at least one $C_3$-$C_{10}$ alpha-olefin, such copolymer containing from 10 to 70% by weight of ethylene, being soluble in xylene at room temperature, and having an intrinsic viscosity in tetrahydronaphtalene at 135° C. of higher than 3.5 dl/g; and (C) from 10 to 40% by weight of glass fibers.

9 Claims, No Drawings

POLYPROPYLENE COMPOSITION FOR FOAMING

This application is a Continuation Application that claims benefit to U.S. Non-Provisional application Ser. No. 14/355,476 filed Apr. 30, 2014, that is the U.S. National Phase of PCT International Application PCT/EP2012/070443, filed Oct. 16, 2012, claiming priority of European Patent Application No. 11187518.3, filed Nov. 2, 2011, and the benefit under 35 U.S.C. 119(e) of U.S. Provisional No. 61/554,830 filed Nov. 2, 2011, the contents of which are incorporated herein by reference in its entirety.

FIELD OF THE INVENTION

The present invention relates to glass-fiber-reinforced thermoplastic polypropylene compositions for use in foaming of molded articles having smooth surface and an inner foam structure.

BACKGROUND OF THE INVENTION

Typically, integrally foamed articles having smooth, mold-imprinted surfaces are used in trim components for interior designs, e.g. in cars or airplanes. Due to their free-flowing characteristics, different blends filled with talcum have been used in such applications hitherto. The potential of talcum-reinforced blends is limited for integral foam-molding of rigid finished articles, such as car dashboards, due to their inherent low flexural stiffness. Further, the relative volumetric increase during foaming is limited. Nonetheless talcum blends, due to their excellent free-flowing properties, have allowed achieving a very uniform, homogenous foam structure and foam cell separation pattern, without inner delamination of the foam or widespread cell disrupture taking place.

It would be desirable to avoid the disadvantages of the prior art and to devise a new composite material improving volumetric gain in integral foaming of molded articles whilst retaining the advantages of the prior art blends used in foaming, notably their excellent free-flowing properties and uniform cell forming characteristics.

SUMMARY OF THE INVENTION

Accordingly, an object of the present invention is a composition comprising:
(A) from 40 to 85% by weight of a first propylene-based component being selected from propylene homopolymers, propylene copolymers and heterophasic propylene polymer, such first propylene-based component having a flexural modulus determined in accordance with ISO 178 higher than 800 MPa;
(B) from 5 to 20% by weight of a second propylene-based component being a heterophasic propylene polymer comprising:
  (B1) from 20 to 90% by weight, preferably from 50 to 90%, of a crystalline polypropylene, and
  (B2) from 10 to 80% by weight, preferably from 15 to 60% by weight, of a copolymer of ethylene and at least one C3-C10 alpha-olefin, such copolymer containing from 10 to 70% by weight, preferably from 10 to 50% by weight, of ethylene, being soluble in xylene at room temperature, and having an intrinsic viscosity in tetrahydronaphtalene at 135° C. of higher than 3.5 dl/g, preferably higher than 4 dl/g, more preferably of from 5 to 8 dl/g; and
(C) from 10 to 40% by weight of glass fibers.

The sum of the percentage amounts of the individual components of the composition equal to 100 percent.

DETAILED DESCRIPTION OF THE INVENTION

The first propylene-based component (A) can suitably be a propylene homopolymer or copolymer containing up to 5% by weight of ethylene and optionally one or more $C_4$-$C_{10}$ alpha-olefin(s). Examples of $C_4$-$C_{10}$ alpha-olefins that may be used as comonomers include 1-butene, 1-pentene, 1-hexene, 4-methyl-1-pentene and 1-octene, with 1-butene being particularly preferred.

As a suitable alternative, the component (A) can be a heterophasic propylene polymer containing from 5 to 25% by weight of a copolymer of propylene and ethylene, such copolymer containing from 40 to 60% by weight of ethylene.

Suitably said component (A) has a MFR (230° C., 2.16 kg) value of from 10 to 150 g/10 min.

Also suitably, said component (A) has a content of xylene-soluble fraction (at 25° C.) of less than 7% by weight, preferably of less than 5% by weight, even more preferably of less than 2% by weight.

Generally said component (A) has amount of isotactic pentads higher than 95%. The component (B) can suitably be prepared by a sequential polymerization, comprising at least two sequential steps, wherein components (B1) and (B2) are prepared in separate subsequent steps, operating in each step in the presence of the polymer formed and the catalyst used in the preceding step.

Within the second propylene-based component (B) the component (B1) can suitably be a crystalline propylene (co)polymer being for at least 85% by weight, preferably at least 90% by weight, more preferably at least 95% by weight, insoluble in xylene at 25° C.

Within the second propylene-based component (B) the component (B2) can suitably be an ethylene copolymer containing from 15 to 60% by weight, preferably from 20 to 40% by weight of a C3-C10 alpha olefin, preferably propylene, being for at least 60% soluble in xylene at room temperature. Polymer compositions suitable as component (B) are those disclosed in International Application WO 02/28958, specifically compositions comprising (percent by weight):
A) 20%-90% of a crystalline polypropylene component containing from 25% to 75% of a fraction $A^I$ having a melt flow rate $MFR^I$ of from 0.5 to 10 g/10 min., and from 75% to 25% of a fraction $A^{II}$ having a melt flow rate $MFR^{II}$ such that a ratio $MFR^{II}/MFR^I$ is from 30 to 2000, preferably from 50 to 1000; and wherein fractions $A^I$ and $A^{II}$ are independently selected from the group consisting of a propylene homopolymer, a random copolymer of propylene containing up to 8% of ethylene, and a random copolymer of propylene containing up to 8% of at least one C4-C10 alpha-olefin; and
B) 10%-80% of a copolymer component of ethylene and at least one C3-C10 alpha-olefin, the copolymer containing from 10 to 70% of ethylene, and optionally minor amounts of a diene, said copolymer being soluble in xylene at room temperature, and having an intrinsic viscosity in tetrahydronaphtalene at 135° C. of from 4 to 9, preferably 5 to 8, most preferably 5.5 to 7 dl/g.

Other polymer compositions suitable as component (B) are those disclosed in International Application WO 2004/087805, specifically compositions comprising (percent by weight):

A) 50-90% of a crystalline polypropylene component comprising:

$A^I$) from 25 to 75% of a fraction having a melt flow rate $MFR^I$ of from 0.1 to 10 g/10 min.; and $A^{II}$) from 25 to 75% of a fraction having a melt flow rate value $MFR^{II}$ equal to or lower than 100 g/10 min.;

wherein the ratio $MFR^{II}/MFR^I$ is from 5 to 60, and the fractions ($A^I$) and ($A^{II}$) are independently selected from the group consisting of a propylene homopolymer, a random copolymer of propylene containing up to 3% of ethylene, and a random copolymer of propylene containing up to 6% of at least one C4-C10 alpha-olefin; and B) 10%-50% of a copolymer component of ethylene and at least one C3-C10 alpha-olefin, the copolymer containing from 15% to 50% of ethylene and optionally minor amounts of a diene; said composition having a value of the intrinsic viscosity of the fraction soluble in xylene at room temperature (about 25° C.) equal to or higher than 3.5 dl/g.

According to the present invention, it is neither necessary nor desired to crosslink the components (A) and (B) by vulcanization.

The glass fibers (C) suitably have a length of from 0.1 to 20 mm, preferably from 0.3 to 1.0 mm, when measured in the final compound, and also suitably have a diameter of less than 50 µm, preferably of from 10 to 15 µm. The glass fibers are of short length, such as to allow of simple process engineering of the thermoplastic composition of the invention. Long glass fibers, whilst known to convey enhanced stiffness characteristics, require special processing methods as to prevent shearing and breakage of such long fibers. Short glass fibers, however, require nucleation for attaining a similar stiffness of the ensuing molding composition, in particular when using cut glass fibers.

Further preference is given to using cut glass fibers, also known as chopped strands. Such preferred glass fibers have a length of from 3 to 8 mm, more preferably of from 3 to 6 mm, before compounding, and of from 0.1 to 1.5 mm after compounding, and have a diameter of from 5 to 25 µm, preferably of from 10 to 15 µm. Glass fibers obtained from commercial source are pretreated with a usually polar-functionalized compatibilizer, as the skilled person well knows. Such compatibilizer serves to make the glass fibers less hydrophilic and therefore more compatible with the polymer, allowing the glass fiber to bind more effectively to the polyolefin matrix.

The compositions of the present invention have preferably a melt flow rate value (ISO 1133-230° C., 2.16 Kg) of from 10 to 150 g/10 min, preferably of from 70 to 120 g/10 min.

Optionally, the composition of the present invention may comprise a nucleator for physical foaming by gas injected and physically dissolved into the polymer. Said nucleator can suitably be talc, lithium carbonate, a zeolite or a mixture thereof.

Further optionally the composition of the present invention may comprise talc in amounts preferably not higher than 3% by weight.

The compositions of the present invention can be prepared by mechanically mixing its components.

The compositions of the present invention suitably show flexural modulus higher than 1500 MPa, preferably higher than 2000 MPa, more preferably higher than 3000 MPa.

The compositions of the present invention also suitably show tensile modulus higher than 1500 MPa, preferably higher than 2000 MPa, more preferably higher than 3000 MPa.

The compositions of the present invention further suitably show a C-emission value of less than 50 g/10 min, preferably of less than 20 g/10 min.

The compositions of the present invention, due to the combination of properties (high stiffness, high flowability and good impact behavior) are particularly suitable for integral foaming of molded articles such as finished parts for the automotive industry, e.g. instrument panels of cars.

Accordingly, another object of the present invention is a foamed article prepared from a composition according to the invention. Said foamed articles, which are not obtained by reactive modification by vulcanization, have suitably a density of from 0.5 to 1.1 g/cm3. They can be integrally foamed article, wherein the average cell size is preferably of from 5 to 500 µm.

A suitable process for integral foaming of molded articles is the so-called 'breathing mold process' illustrated in FIG. 1. The melt is injected into the mold, as in conventional injection molding. Prior to injection however, during melting and extrudating of the melt, an inert gas is added under pressure, to be physically dissolved and homogenized in the melt (physical foaming). It is likewise possible to use chemical blowing agents, either optionally or in conjunction with such gas. Typical chemical blowing agents are inert, volatile liquids, such as e.g. lower hydrocarbons, having a boiling point of higher than 80° C. whose expansion is triggered by heating the mold. Other examples are hydrogen carbonates which release carbon dioxide under heat. It is also possible to add such chemical blowing agents contained in microspheres, which microspheres allow of easier homogenization and handling and which are disrupted upon expansion. Typically, such integral foams have a sandwich structure, as essentially derived from expansion of a molded sheet; both the parallel, large surfaces flanking, as in sandwich, the foam layer, retain their dense structure as in the original sheet. After injection in the mold of gas-loaded melt, the mold volume filled with the melt polymer is caused to increase and the foam is thus formed.

Foamed articles according to the present invention can be, for example, finished parts for the automotive industry, such as dashboards, instrument panels or other interior trim components for a car.

According to a further object, the present invention provides a vehicle, such as a car or a truck, comprising a foamed article according to the invention.

The following examples are given to illustrate the present invention without any limiting purpose.

EXAMPLES

Measurement Methods

The characterization data for the propylene polymers and for the obtained films were obtained according to the following methods:

Melt Flow Rate (MFR)

Determined according to ISO 1133 (230° C., 2.16 Kg).

Flexural Modulus

Determined according to ISO 178.

Tensile Modulus

Determined according to ISO 527/1+2.

Charpy

Determined according to ISO 179/1 eU and/1 eA.

Xylene Solubles (XS)

Determined as follows: 2.5 g of polymer and 250 ml of xylene are introduced in a glass flask equipped with a refrigerator and a magnetical stirrer. The temperature is raised in 30 minutes up to the boiling point of the solvent.

The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Determination of Isotactic Pentads Content

Determined as follows: 50 mg of each xylene insoluble fraction were dissolved in 0.5 mL of C2D2C14. The 13C NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference. The microstructure analysis was carried out as described in literature (Polymer, 1984, 25, 1640, by Inoue Y. et Al. and Polymer, 1994, 35, 339, by Chujo R. et Al.).

All compositions described in the examples were produced with a twin-screw extruder Krupp Werner & Pfleiderer/1973, ZSK 53, screw diameter: 2×53, 36D with a screw rotation speed of 150 rpm and a melt temperature of 230° C. to achieve the compounds for foaming tests.

All compounds were foamed under the same processing conditions with a Battenfeld BA 1500/630 injection molding machine, melt temperature: 220° C., mold temperature: 35° C., injection pressure: 1500 bar, either with physical blowing agent (0.3% nitrogen) or with chemical blowing agent (2% Hydrocerol ITP 815). The high pressure foam process was used to produce the foamed flat plates. After injection under high pressure the material starts foaming when opening the mold by a controlled distance. This opening distance controls the final thickness of the part and thus the final density.

Example 1 (Comparative)—Composition

The composition was built up with:
75.1% Moplen EP600V, a heterophasic copolymer available from LyondellBasell having MFR (ISO 1133-230° C., 2.16 Kg) of 100 g/10 min;
1% Moplen HP500N, a homopolymer available from LyondellBasell having MFR (ISO 1133-230° C., 2.16 Kg) of 12 g/10 min;
0.2% Irgafos 168 (tris(2,4-di-tert-butylphenyl)phosphite);
0.3 Irganox 1010 (pentaerythriltetrakis(3-(3,5-die-tert-butyl-4-hydroxyphenyl)propionate));
0.1% zinc oxide;
1% BK MB-PE 4687 (Cabot) black masterbatch;
20% short glass fiber ECS 03T-496 chopped strands (NEG), having a length of 4 mm and a diameter of 13 μm;
1% coupling agent, MAH grafted polypropylene;
0.1% Hostanox SE 10 (dioctadecyldisulphide);
0.2% Crodamide ER (Erucamide, (Z)-Docos-13-enamide);
1% Talc Luzenac 1445 (hydrated magnesium silicate).

The properties of the final unfoamed composition are reported in table 1.

Example 2—Composition

The composition was built up with:
65% Moplen EP600V, a heterophasic copolymer available from LyondellBasell having MFR (ISO 1133-230° C., 2.16 Kg) of 100 g/10 min;
10.1% Hifax X 1956 A, a reactor-made TPO (thermoplastic polyolefin) available from LyondellBasell having MFR (ISO 1133-230° C., 2.16 Kg) of 1.2 g/10 min, an intrinsic viscosity in tetrahydronaphtalene at 135° C. of the fraction soluble in xylene at room temperature of 7 dl/g, being built up with 35% homopolymer with MFR (ISO 1133-230° C., 2.16 Kg) of 73 g/10 min, 35% homopolymer with MFR (ISO 1133-230° C., 2.16 Kg) of 1.2 g/10 min, and 30% ethylene/propylene copolymer with 36% by weight of ethylene units;
1% Moplen HP500N, a homopolymer available from LyondellBasell having MFR (ISO 1133-230° C., 2.16 Kg) of 12 g/10 min;
0.2% Irgafos 168 (Tris(2,4-di-tert-butylphenyl)phosphite);
0.3% Irganox 1010 (Pentaerythrittetrakis (3-(3,5-die-tert-butyl-4-hydroxyphenyl)propionate));
0.1% zinc oxide;
1% BK MB-PE 4687 (Cabot) black masterbatch;
20% short glass fiber ECS 03T-496 chopped strands (NEG), having a length of 4 mm and a diameter of 13 μm;
1% coupling agent, MAH grafted polypropylene;
0.1% Hostanox SE 10 (Dioctadecyldisulfid);
0.2% Crodamide ER (Erucamide, (Z)-Docos-13-enamid);
1% Talc Luzenac 1445 (hydrated magnesium silicate).

The properties of the final unfoamed compositions are reported in table 1.

TABLE 1

|  | Ex. 1-comparative | Example 2 |
|---|---|---|
| MFR [g/10 min] | 45 | 20 |
| Tensile modulus [MPa] | 4700 | 4500 |
| Flexural modulus [MPa] | 4000 | 4200 |
| Charpy notched at RT [KJ/m2] | 7 | 11 |

Examples 3 (Comparative), 4 and 5—Foamed Articles

The compositions of examples 1 (comparative) and 2 were submitted to foaming by mold opening ("breathing mold") to obtain flat plates with 1.6 mm thickness and 1.07 g/cm3 density. The samples were foamed either with a chemical agent (2% Hydrocerol ITP 815) or with a physical agent (nitrogen). Table 2 shows the results. The foaming behavior is described as a function of the opening distance. As it can be seen, the composition used in comparative example 3 shows a good foaming behavior by opening the mold from 1.6 mm to 2.8 mm. At a higher opening distance no foaming process was possible because the foam became destroyed by cell wall rupture. The outer layers of the foamed plate delaminated due to the destroyed foam structure. The lowest achievable density was 0.61 dl/g. Conversely, the compositions used in example 4 survived the process also by opening the mold up to 3.6 mm, which means that it is possible to realize higher density reduction with this material. A final density of 0.47 dl/g could be achieved. Example 5 shows that it is also possible to use this material for foaming with physical blowing agents. By opening the mold from 1.6 mm to 4.6 mm a final density as low as 0.37 dl/g could be achieved.

TABLE 2

| | Example 3-comparative | | | Example 4 | | | Example 5 | | |
|---|---|---|---|---|---|---|---|---|---|
| Material | Example 1-comparative | | | Example 2 | | | Example 2 | | |
| Blowing agent | chemical | | | chemical | | | physical | | |
| Plate thickness after foaming [mm] | 2.1 | 2.8 | 3.7 | 2.1 | 3.0 | 3.6 | 3.0 | 3.7 | 4.6 |
| Total density [dl/g] | 0.81 | 0.61 | 0.46 | 0.81 | 0.57 | 0.47 | 0.57 | 0.46 | 0.37 |
| Cell structure | closed | closed | open | closed | closed | closed | closed | closed | closed |
| Average cell size [mm] (method: nominal diameter) | 0.14 | 0.17 | n. a. | 0.15 | 0.20 | 0.20 | 0.26 | 0.22 | 0.2 |
| Delamination | no | No | yes | no | no | no | no | no | no |
| Foaming behavior | good | good | bad | good | good | good | good | good | good |

What is claimed is:

1. A composition comprising:
(A) 40-85% by weight of a first propylene-based component, wherein the first propylene-based component is a heterophasic propylene polymer, wherein the heterophasic propylene polymer contains from 5 to 25 wt. % of copolymer of propylene and ethylene, wherein the copolymer of propylene and ethylene contains from 40 to 60 wt. % of ethylene,
wherein the first propylene-based component has a MFR (230° C., 2.16 kg) from 10 to 150 g/10 min., and has a flexural modulus determined in accordance with ISO 178 higher than 800 MPa;
(B) 5-20% by weight of a second propylene-based component being a heterophasic propylene polymer comprising:
B1) 20%-90% of a crystalline polypropylene component containing 25-75% of a fraction $A^I$ having a melt flow rate $MFR^I$ of 0.5-10 g/10 min., and 25-75% of a fraction $A^{II}$ having a melt flow rate $MFR^{II}$ such that the ratio of $MFR^{II}/MFR^I$ is 30-2000; and wherein fractions $A^I$ and $A^{II}$ are independently selected from the group consisting of a propylene homopolymer, a random copolymer of propylene containing up to 8% of ethylene, and a random copolymer of propylene containing up to 8% of at least one $C_4$-$C_{10}$ alpha-olefin; and
B2) 10%-80% of a copolymer component of ethylene and at least one $C_3$-$C_{10}$ alpha-olefin, the copolymer containing 10-70% of ethylene, and optionally minor amounts of a diene, said copolymer being soluble in xylene at room temperature, and has an intrinsic viscosity in tetrahydronaphthalene at 135° C. of 4-9 dl/g; and
(C) 10-40% by weight of glass fibers.

2. The composition of claim 1, wherein the copolymer (B2) has an intrinsic viscosity in tetrahydronaphthalene at 135° C. of from 5-8 dl/g.

3. The composition according to claim 1, wherein the component (B) comprises (percent by weight):
B1) 25-85% of the crystalline polypropylene component, wherein the fraction $A^I$ has a melt flow rate $MFR^I$ of 0.5-5.0 g/10 min. and the fraction $A^{II}$ has a melt flow rate $MFR^{II}$ such that the ratio of $MFR^{II}/MFR^I$ is 50-1000 and
B2) 15 to 75% of the copolymer component of ethylene and at least one $C_3$-$C_{10}$ alpha-olefin, said copolymer having an intrinsic viscosity in tetrahydronaphthalene at 135° C. of 5-8 dl/g.

4. The composition according to claim 1, wherein the component (B) comprises (percent by weight):
B1) 50-90% of the crystalline polypropylene, wherein the $MFR^{II}$ is equal to or lower than 100 g/10 min.,
wherein the ratio $MFR^{II}/MFR^I$ is from 30-60, and the fractions ($A^I$) and ($A^{II}$) are independently selected from the group consisting of a propylene homopolymer, a random copolymer of propylene containing up to 3% of ethylene, and a random copolymer of propylene containing up to 6% of at least one $C_4$-$C_{10}$ alpha-olefin; and
B2) 10%-50% of the copolymer component of ethylene and at least one $C_3$-$C_{10}$ alpha-olefin, wherein the copolymer contains from 15-50% of ethylene and optionally minor amounts of a diene;
said component (B) having a value of the intrinsic viscosity in tetrahydronaphthalene at 135° C. of the fraction soluble in xylene at room temperature equal to or higher than 3.5 dl/g.

5. The composition according to claim 1, wherein the glass fibers (C) have a length of from 0.1-20 mm and have a diameter of less than 50 μm.

6. The composition according to claim 1, having a melt flow rate value (ISO 1133—230° C., 2.16 kg) of from 10-150 g/10 min.

7. A foamed article prepared from the composition of claim 1.

8. A foamed article of claim 7, wherein the foamed article is a finished part for use in the automotive industry.

9. A vehicle comprising the foamed article of claim 8.

* * * * *